(12) United States Patent
Garnett

(10) Patent No.: US 6,851,614 B2
(45) Date of Patent: Feb. 8, 2005

(54) COMPUTER CONFIGURATION

(75) Inventor: Paul J. Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 139 days.

(21) Appl. No.: 10/287,211

(22) Filed: Nov. 4, 2002

(65) Prior Publication Data
US 2003/0140221 A1 Jul. 24, 2003

(30) Foreign Application Priority Data

Jan. 21, 2002 (GB) .............................................. 0201266

(51) Int. Cl.⁷ .............................................. G06K 19/00
(52) U.S. Cl. ........................ 235/487; 709/220; 704/33
(58) Field of Search .......................... 709/220; 704/33; 710/104; 713/1, 2; 235/472.01, 487

(56) References Cited

U.S. PATENT DOCUMENTS

| 5,590,038 A | * | 12/1996 | Pitroda | 705/41 |
| 5,777,903 A | * | 7/1998 | Piosenka et al. | 708/100 |
| 5,857,079 A | * | 1/1999 | Claus et al. | 705/33 |
| 5,954,808 A | * | 9/1999 | Paul | 710/104 |
| 5,983,273 A | | 11/1999 | White et al. | |
| 5,991,875 A | * | 11/1999 | Paul | 713/2 |
| 6,192,436 B1 | * | 2/2001 | Jacobson et al. | 710/104 |
| 6,202,927 B1 | * | 3/2001 | Bashan et al. | 235/451 |
| 6,353,885 B1 | * | 3/2002 | Herzi et al. | 713/1 |
| 6,598,032 B1 | | 7/2003 | Chellener et al. | |
| 6,654,797 B1 | * | 11/2003 | Kamper | 709/220 |
| 6,736,313 B1 | | 5/2004 | Dickson | |
| 6,751,671 B1 | | 6/2004 | Urien | |

* cited by examiner

Primary Examiner—Daniel Stcyr
Assistant Examiner—Daniel A. Hess
(74) Attorney, Agent, or Firm—Meyertons Hood Kivlin Kowert & Goetzel, P.C.; B Noël Kivlin

(57) ABSTRACT

A portable programmable data carrier comprises a processor, a program memory for storing operating commands for the processor and a data memory for storing configuration data for a programmable processing apparatus. The data carrier is powered by an integral power supply. Configuration data for storage in the data memory is manually input via a manual input means, and stored configuration data is displayed on a display. Configuration data stored in the data memory may be transferred to a programmable processing apparatus via matched interface means of the data carrier and the programmable processing apparatus.

19 Claims, 13 Drawing Sheets

COMPUTER CONFIGURATION

BACKGROUND OF THE INVENTION

The present invention relates to programmable portable data carrier devices, and in particular but not exclusively to portable programmable data carriers for storing and providing configuration data to programmable processing apparatuses such as computer servers.

There is a requirement in many fields of computer usage for a computer to have a maximum possible availability. That is, the down-time of a computer system should be as small as possible. The down time of a computer system is a period during which a computer system is inoperable as a result of a fault in the system. If a computer system goes down, the inconvenience and loss of revenue can be substantial. For example, if a computer system is operating as a server or exchange forming part of a telecommunications system, then during the down-time no communications can be performed using the telecommunications system, which can result in a considerable loss of business and therefore revenue for an organisation. Computer systems are therefore arranged to be as reliable as possible, so that the down-time is reduced to a minimum.

Computer systems are designed and manufactured to standards that reduce as far as possible the likelihood of malfunction. However, in order to minimise any down-time, which may occur as a result of a malfunction, it has been proposed to design parts of the computer system such that the parts can be replaced as quickly as possible with a part which performs the same function. For example, a processing unit, which includes for example a hard-disk drive, can be arranged to be replaceable. The processing unit often forms part of a computer system that executes software processes that control the computer system. As such, when a malfunction occurs in the processing unit, the unit is replaced by an equivalent processing unit. To this end, the hard-disk of the unit is often provided with pre-loaded software that is equivalent to the software processes loaded onto the original hard-disk. The original processing unit will then be repaired off-line, which is particularly advantageous because such repairs may be time consuming.

Computer systems often include, or are arranged to be connectable to, a communications network. This can be used to effect communications between different parts of the computer system, the communications network being a local bus, or communications between different computer systems, the communications network being a local area network, wide area network or the like.

In order to effect replacement of a processing unit, the replacement processing unit should be arranged to communicate via the communications network, in substantially the same way as the original processing unit communicated. In order to minimise down time, it is desirable that the replacement is made as quickly and efficiently as possible.

A system and method for providing a network address to a computer system by storing the network address on a memory card such as a smartcard to be read by an appropriate reader in the computer system is described in the applicant's co-pending International application No. PCT/US01/27318 entitled "System Card Configuration".

SUMMARY OF THE INVENTION

One aspect of the present invention provides a portable programmable data carrier comprising a processor, a storage operable to store instructions and setup data for a programmable processing apparatus, a user input interface operable to receive manual input of data, a display operable to display stored data, and a communication interface operable to interface with a programmable processing apparatus to transfer stored setup data from the data memory to the programmable processing apparatus.

An embodiment of the invention can thus enable a user such as a system administrator in charge of a computer server to provide essential setup data to that server without having to communicate with the server over a network link. The user can also set up a number of different servers requiring different setup data using the same or identical data carriers by manually entering the required setup data for each server individually.

In a particular embodiment, the portable programmable data carrier conforms to a smartcard or PC-Card standard such as ISO 7816, ISO 10536 or PCMCIA so that a standard card reader may be easily incorporated into the programmable processing apparatus to be setup using the setup data stored in the data carrier.

In another particular embodiment, the portable programmable data carrier comprises a power supply to provide power to the data carrier so that the data carrier may be used without recourse to an external power supply for manual inputting or reviewing of setup data.

In a further particular embodiment, the power supply is a photocell integrated into a surface of the data carrier such that the data carrier can be powered by the photocell when in use for manual inputting or reviewing of setup data.

In another particular embodiment, the data carrier additionally comprises a security data memory which stores predetermined security data useable by the data carrier to compare to an inputted security code to determine whether the user of the data carrier is duly authorised.

In yet another particular embodiment, a plurality of different security data are stored in the security data memory corresponding to a plurality of different security codes, such that a plurality of levels of authorisation may be enabled.

Another aspect of the present invention, provides a method of providing setup data to a programmable processing apparatus such as a computer server. The method comprises: inputting setup data to a portable programmable data carrier via a manual input interface, storing the inputted setup data in data carrier storage, and transferring the stored setup data from the data carrier storage to the programmable processing apparatus via matched communication interfaces of the data carrier and processing apparatus.

Other objects and advantages of the present invention will become apparent upon reading of the following detailed description of embodiments and upon reference to the accompanying drawings.

BRIEF DESCRIPTION OF THE DRAWINGS

Embodiments of the present invention will now be described, by way of example only, with reference to the accompanying drawings, in which.

Figure 1:
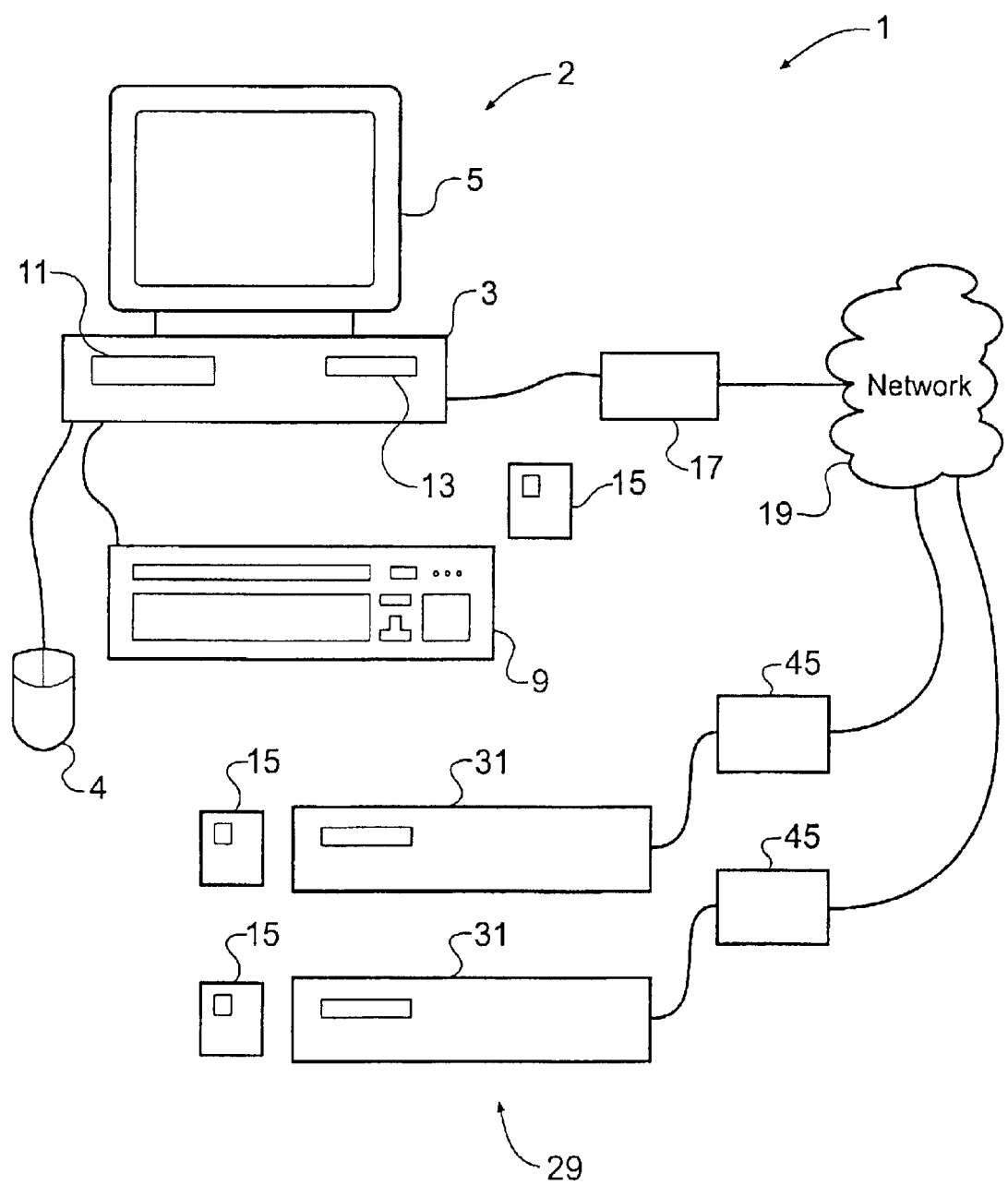
FIG. 1 is a schematic diagram of a networked computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Shown in FIG. 1 is a networked computer system 1 in which a programmable portable data carrier according to a first embodiment may be utilised. In FIG. 1 is shown a computer system user terminal 2 comprising a system unit 3 in which a processor, memory and hard disk drive (not shown) may be located, the system unit 3 having connected thereto a display 5 for visually outputting data to a user. Also connected to the system unit 3 are a mouse 7 and a keyboard 9 for use by a user in inputting data to the computer terminal. Associated with the system unit 3 is a removable media drive 11 such as a floppy disk drive, a CDROM drive, DVD drive, etc. for non-network transfer of programs and data. In order that the computer terminal 2 is able to communicate via a network, it must be set up in accordance with certain configuration data to be able to communicate with the network. Such configuration data may include a network address or a host ID. In the computer terminal, this configuration data may be entered manually using the mouse 7 and keyboard 9, or it may be entered by inserting a memory card 15 into a memory card slot 13, the memory card 15 having stored therein the configuration data for the computer terminal 2.

Once the computer terminal 2 has been configured to be able to communicate via a network, a networking connection may be established via a network interface 17 to a network 19. In the present embodiment, the network 19 is an Ethernet based network and thus the network address referred to above will be an Ethernet address.

Also connected to the network 19 are a plurality of network server systems 29. These network server systems 29 comprise a server processor unit 31 in which a processor, memory and hard disk drive (not shown) may be located. Each server processor unit 31 is connected to the network 19 via a network interface 45. In order that the network server system 29 may communicate successfully with the network 19 via the interface 45, it is necessary that the server system 29 be configured to operate in the networked environment. Each server processing unit 31 is therefore equipped with a memory card slot 13 into which a memory card 15 storing configuration data such as an Ethernet address and a host ID may be inserted such that the system 29 can use the configuration data stored therein when communicating with the network 19.

Figure 2:
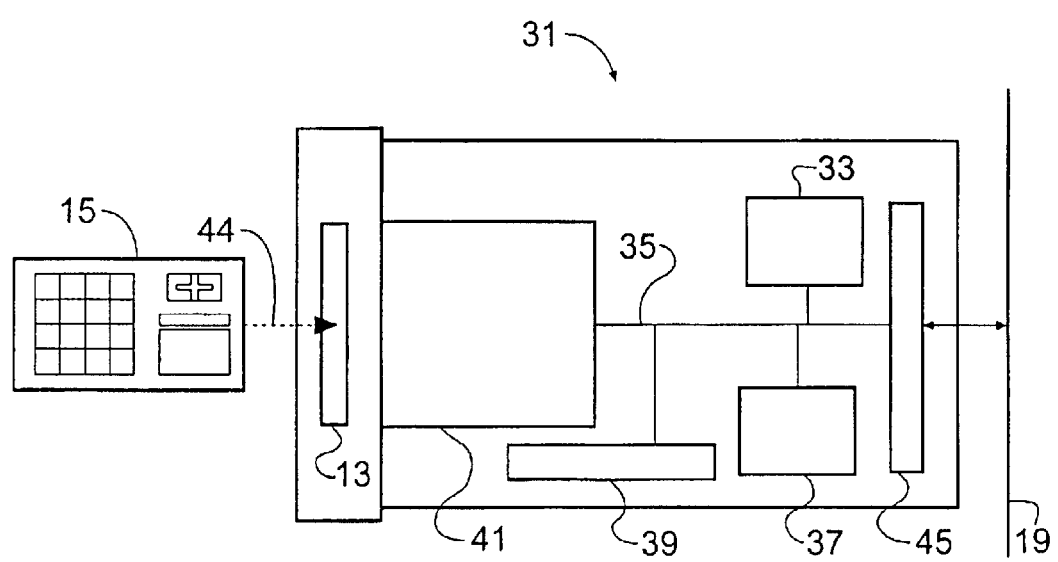
FIG. 2 is a schematic diagram of a processing system arranged to make use of the system of a first embodiment.

Shown in FIG. 2 is a schematic diagram showing the major functional components of the server processor unit 31. Within the server processor unit 31 is a CPU 33 connected via an internal bus 35 to a memory 37 and a boot programmable read only memory (Boot-PROM) 39. The Boot-PROM 39 stores setup information to enable the processor unit 31 to initialise correctly when it is powered up. Also connected to the bus 35 is a card interface 41. A data card 15 inserted through the card slot 13 in the body of the server processor unit 31 may be accessed by the server system via the card interface 41. In order to facilitate communication between the network 19 and the server system 29, a network interface 45 is also connected to the internal bus 35.

Figure 3:
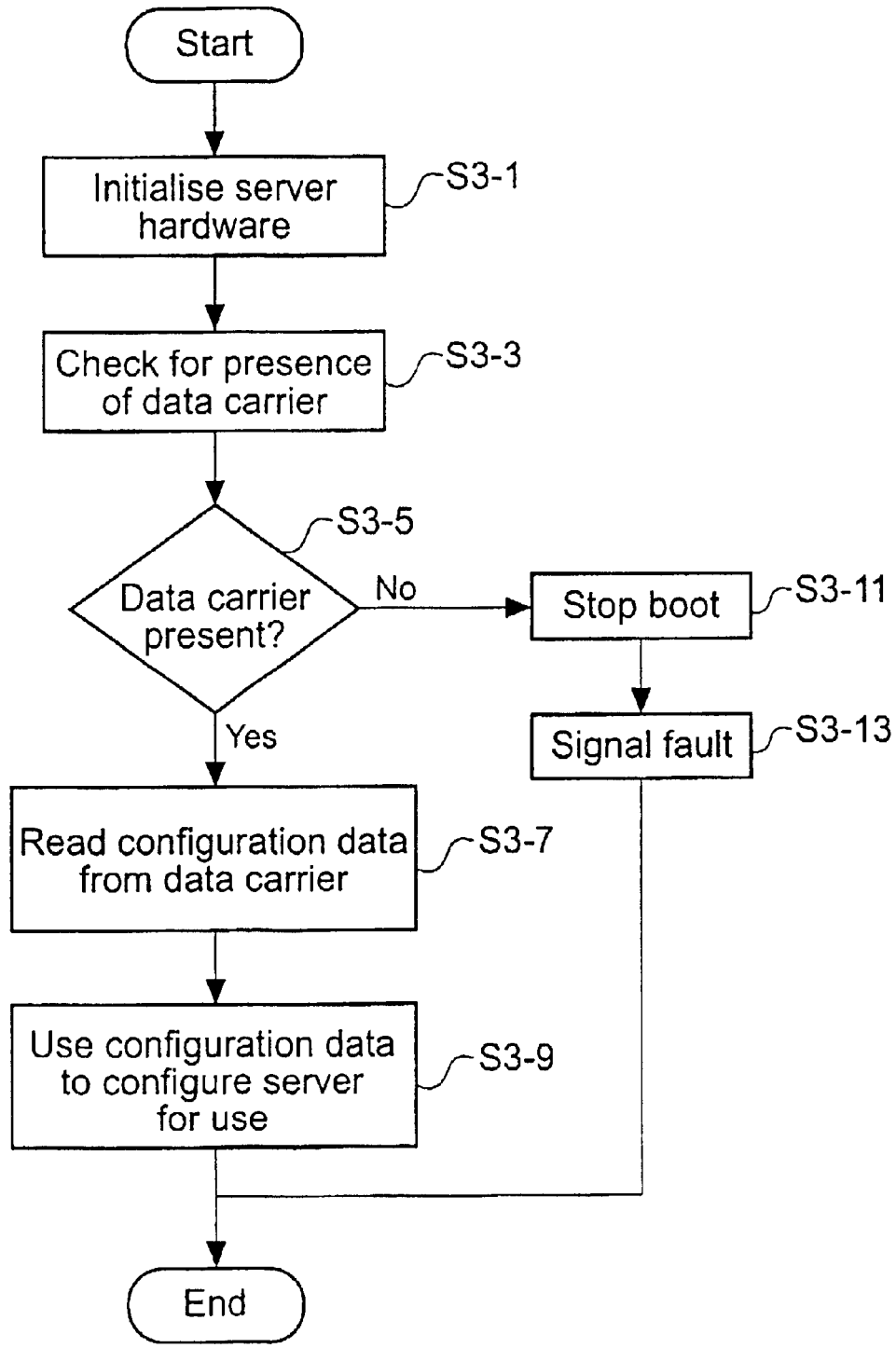
FIG. 3 is a flow chart showing the start up operation of the processor system of FIG. 2.

FIG. 3 is a flow chart showing the processing steps carried out in the server processor unit 31 at power up. First, at step S3-1, the server hardware is initialised, where necessary using data stored in the Boot-PROM 39. Next, at step S3-3, a check is performed to discover whether a data carrier is present in the data carrier reader 41. At step S3-5, a decision is taken based on the result of the check for the presence of a data carrier in the reader 41. If a data carrier is present, then processing continues to step S3-7 where the configuration data is read from the data carrier and then to step S3-9 where the configuration data is used to configure the system 29 for use. Following this, the server initialisation is complete and the server may commence normal operation. On the other hand, if it is discovered at step S3-5 that no data carrier is present in the reader 41, then processing continues at step S3-11 where the boot process is halted and then at step S3-13, a fault is signalled. The fault signal may take the form of a fault light being lit on the outside casing of the server system 29, or alternatively an error data message could be transmitted across the network 19 to a predetermined network address for fault reporting from a default network address for fault reporting.

Thus there has now been described an example of a networked computer system in which a portable programmable data carrier according to the first embodiment may be utilised. Referring now to FIGS. 4 to 8, there will now be described in detail a portable programmable data carrier according to the present embodiment and the modes of operation thereof.

Figure 4:
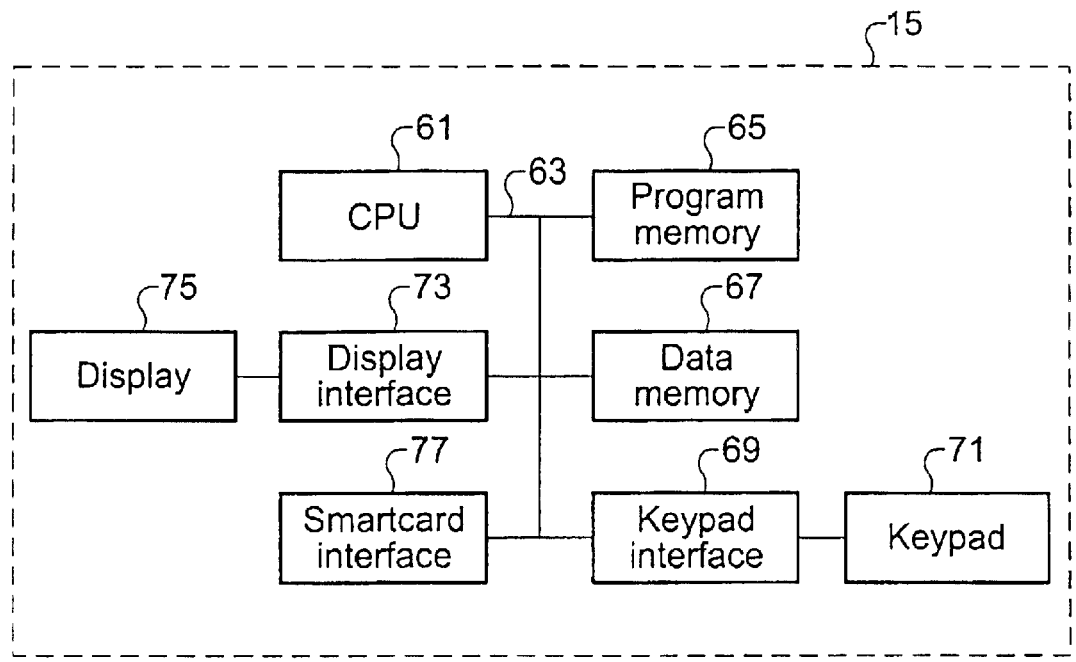
FIG. 4 is a schematic diagram of a programmable portable data carrier according to the first embodiment.

In FIG. 4 is shown a schematic block diagram of the functional components of the portable programmable data carrier. A CPU 61 is connected via an internal bus 63 to a non-volatile program memory 65 storing program instructions for the data carrier 15. Also connected to the data bus 63 is a non-volatile data memory 67 for storing data input to the data carrier 15. Data input to the data carrier 15 is facilitated via a keypad 71 which is connected to the data bus 63 via a keypad interface 69. The keypad 71 is integral to the data carrier 15. Also integral to the data carrier 15 is a display 75 for displaying program data and stored data to a user. The display 75 is connected to the data bus 63 via a display interface 73. In order that the data stored in the data memory 67 may be read by the network server system 29 or computer terminal 2, a smartcard interface 77 is also connected to the data bus 63.

In the present embodiment, the data carrier 15 is a smartcard conforming to the standard ISO 7816 for integrated circuit cards with electrical contacts. Thus the smartcard interface 77 comprises an ISO 7816 electrical contact interface. So that the data carrier 15 may be used with a standard smartcard reader, the integral display 75 and keypad 71 are arranged into the body of a standard credit-card sized smartcard.

Figure 5:
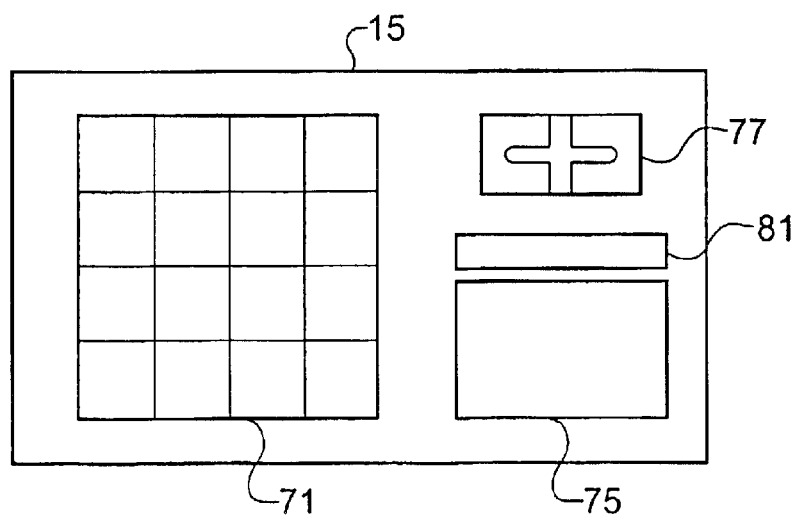
FIG. 5 is a view of a portable programmable data carrier of the first embodiment.

In FIG. 5, the physical appearance of the data carrier 15 is shown. Arranged on the surface of the data carrier 15 are the smartcard interface 77, positioned in accordance with smartcard standards such that the data carrier 15 is compatible with a conventional smartcard reader. Also positioned on the surface of the data carrier 15 are the keypad 71, which is a very thin touch sensitive input keypad formed onto the surface of the data carrier 15. The display 75, which in the present embodiment is an LCD device, is also set into the surface of the data carrier 15. Also present on the data carrier 15 and connected to the other components of the data carrier 15 is a solar cell 81 which is used to power the components of the data carrier 15. As it is the case that a standard smartcard receives operating power from a smartcard reader when the smartcard is inserted into the reader, it is not necessary for the data carrier 15 of the present embodiment to be self-powering while it is in use within a smartcard reader. On the other hand, in order that the data carrier 15 of the present embodiment may be manually programmed with configuration data before it is inserted into a smartcard reader of a computer system requiring configuration, the data carrier 15 requires to be enabled to be powered by some means whilst not inserted into a card reader of a computer system to which the configuration data is to be supplied. As a human user entering configuration data manually into the data carrier 15 will require the presence of visible light in the environment in which he or she is working, a solar cell built in to the data carrier 15 is a suitable power source for the data carrier 15.

Figure 6:
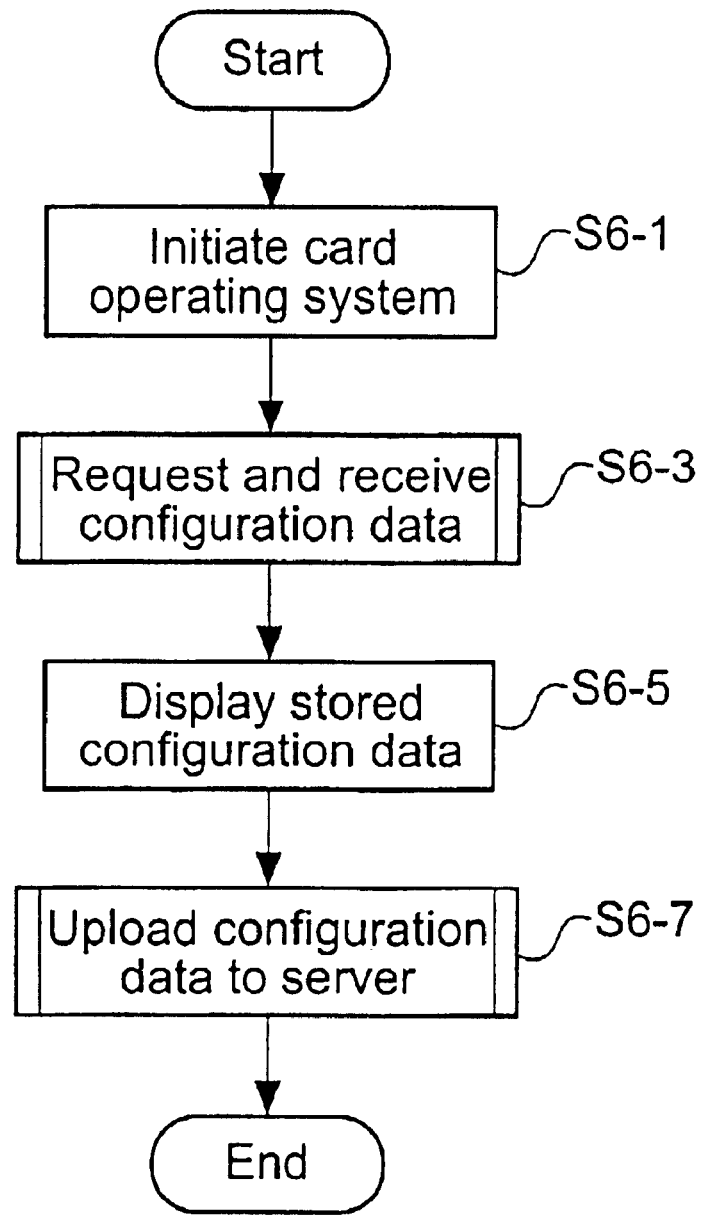
FIG. 6 is a flow chart showing the major program steps of a program carried out by the portable programmable data carrier of FIG. 5.

Referring now to FIG. 6, there are shown the major processing stages undertaken in the operation of the data carrier 15. First, at stage S6-1, when the carrier is switched on by a user, the operating system, as stored in the program memory 65, is started. Next, at stage S6-3, the card requests and receives configuration data from a user. The configuration data stored in the memory 67 is then displayed on the display 75 and stage S6-5. Finally, once the data carrier 15 has been inserted into a card reader 42 associated with a server system 29 or computer terminal 2, the configuration data is uploaded to that server or terminal for use by that terminal at stage S6-7.

Figure 7:
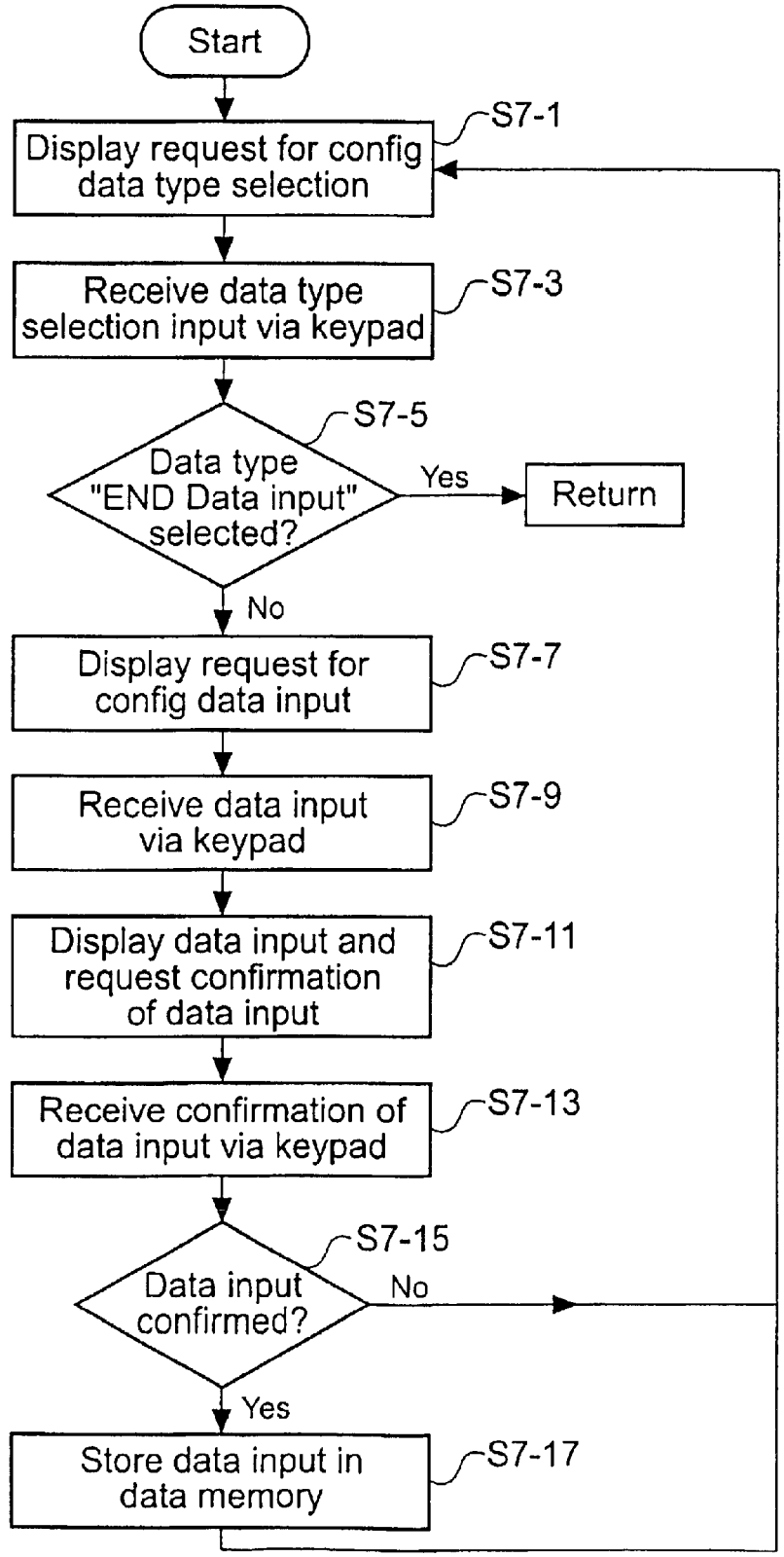
FIG. 7 is a flow chart showing the processing steps involved in the program stage S6-3 of FIG. 6.

Referring now to FIG. 7, there is shown a flow chart setting out the process steps involved in the programme stage S6-3 of FIG. 6. When the request and receive configuration data module is activated, at step S7-1 a request for the configuration data type selection is displayed on the display 75. In the present embodiment, the data type selection takes the form of selecting an option from a menu, the available data types being "Ethernet address", "host ID", and "end data input". At step S7-3, a data type selection input is received via the keypad 71 indicating one of the data types from the menu. At step S7-5, a check is performed to determine whether the data type "end input" was selected. If it is determined that this data type was selected, then the request and receive configuration data process is terminated and processing returns to stage S6-5 of FIG. 6.

On the other hand, if it is determined at step S7-5 that a data type other than "end data input" is selected, then at step S7-7 a request is displayed for the configuration data to be input on the display 75. Processing continues at step S7-9 where a data input is received via the keypad 71.

Next, at step S7-11, the input data is displayed on the display 75 along with a request for confirmation that the input data is to be saved. An input is then received at the keypad 71 to confirm whether or not the input data should be saved, at step S7-13. At step S7-15 the input received at step at S7-13 is analysed to determine whether the input configuration data should be saved. If the input data is not to be saved, then processing returns to step S7-1 and the request for a configuration data type selection is displayed on the display 75. If however the input data is to be saved, then processing continues at step S7-17 where the input configuration data is stored in the data memory 67. Processing then continues at step S7-1 and a further request for configuration data type selection is displayed on the display 75. The process continues to loop until the configuration data type "end data input" is selected.

Figure 8:
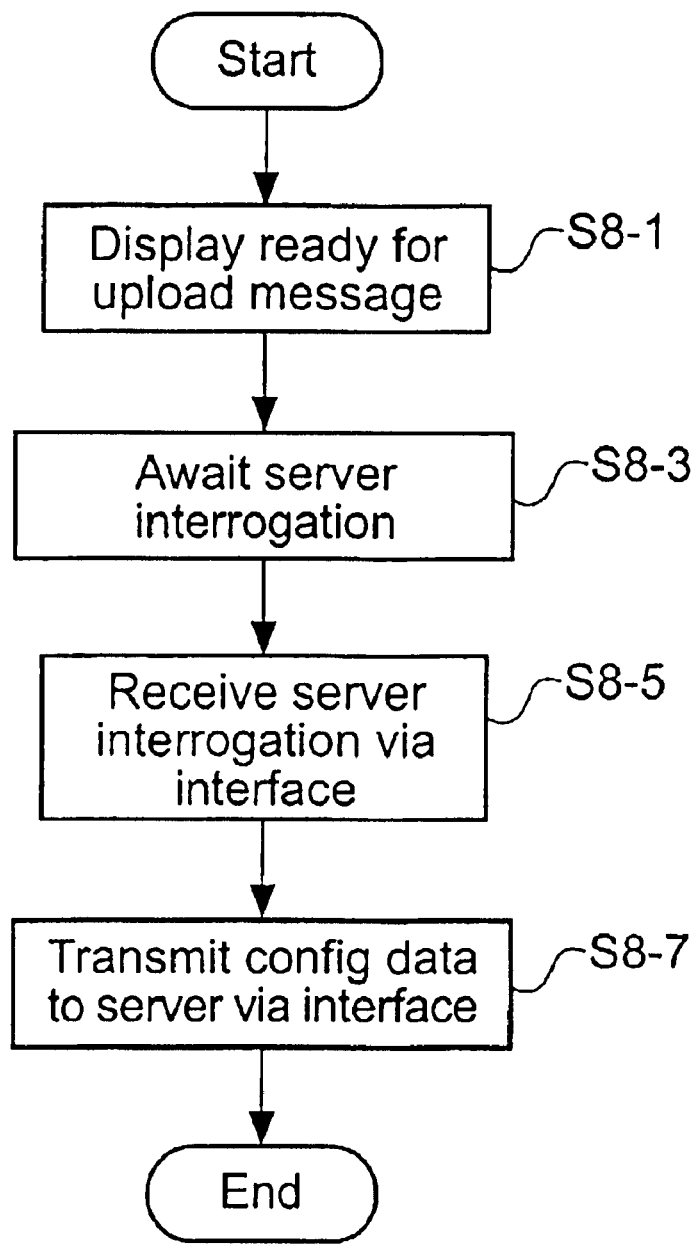
FIG. 8 is a flow chart showing the program steps of the program stage S6-7 of FIG. 6.

Referring now to FIG. 8, the processing steps carried out by the data carrier 15 in the programme stage S6–7 of FIG. 6 will now be described. The "upload configuration data to server" process begins at step S8-1 with the displaying of a message indicating that the data carrier 15 is ready for upload being displayed on the display 75. Next, at step S8-3, the data carrier 15 goes into a wait mode ready for interrogation by the server. Once a user has inserted the data carrier 15 into a card reader 77 associated with the server and the server is powered up, the server will interrogate the data carrier 15. Therefore, at step S8-5, an interrogation message is received from the server via the smartcard interface 77. Finally, at step S8-7, the configuration data stored in the data memory 67 is transmitted to the server via the smartcard interface 77.

Thus a system has been described in which a programmable portable data carrier may be manually loaded with configuration data before being inserted into a programmable processing apparatus which apparatus interfaces with the data carrier to retrieve the configuration data stored therein.

Figure 9:
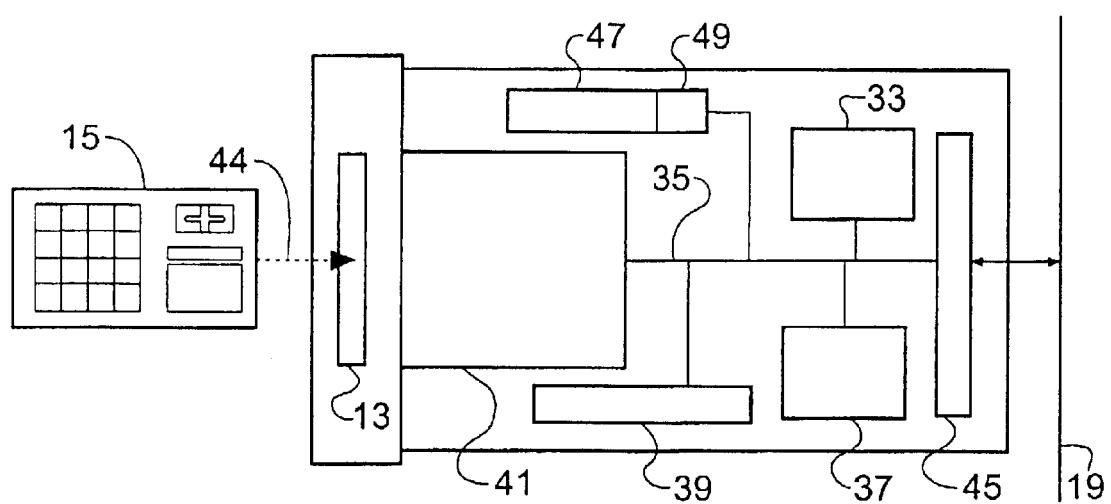
FIG. 9 is a schematic diagram of an alternative processing system arranged to use the system of a second embodiment.

Referring now to FIGS. 9 to 13 a second embodiment of the present invention will now be described. FIG. 9 shows a schematic diagram of the major functional components of a server processor unit 31 according to the second embodiment. In FIG. 9, the processor 33, internal bus 35, memory 37, Boot-PROM 39 and card interface 41 are connected and function the same as the equivalent components already described above with reference to FIG. 2. In the server processor unit 31 of the second embodiment, there is additionally connected to the internal bus 35 a configuration data register 47 which includes a register set flag 49. The configuration data register 47, which is a non-volatile memory, is used to store configuration data received via the card interface 41. Once configuration data has been read from a data carrier 15 using the card interface 41 and has been stored in the configuration data register 47, then the register set flag 49 is set to indicate that configuration data is present in the register. The presence of the network address register 47 therefore allows the server processor unit 31 to operate without having a data carrier 15 permanently inserted therein.

Figure 10:
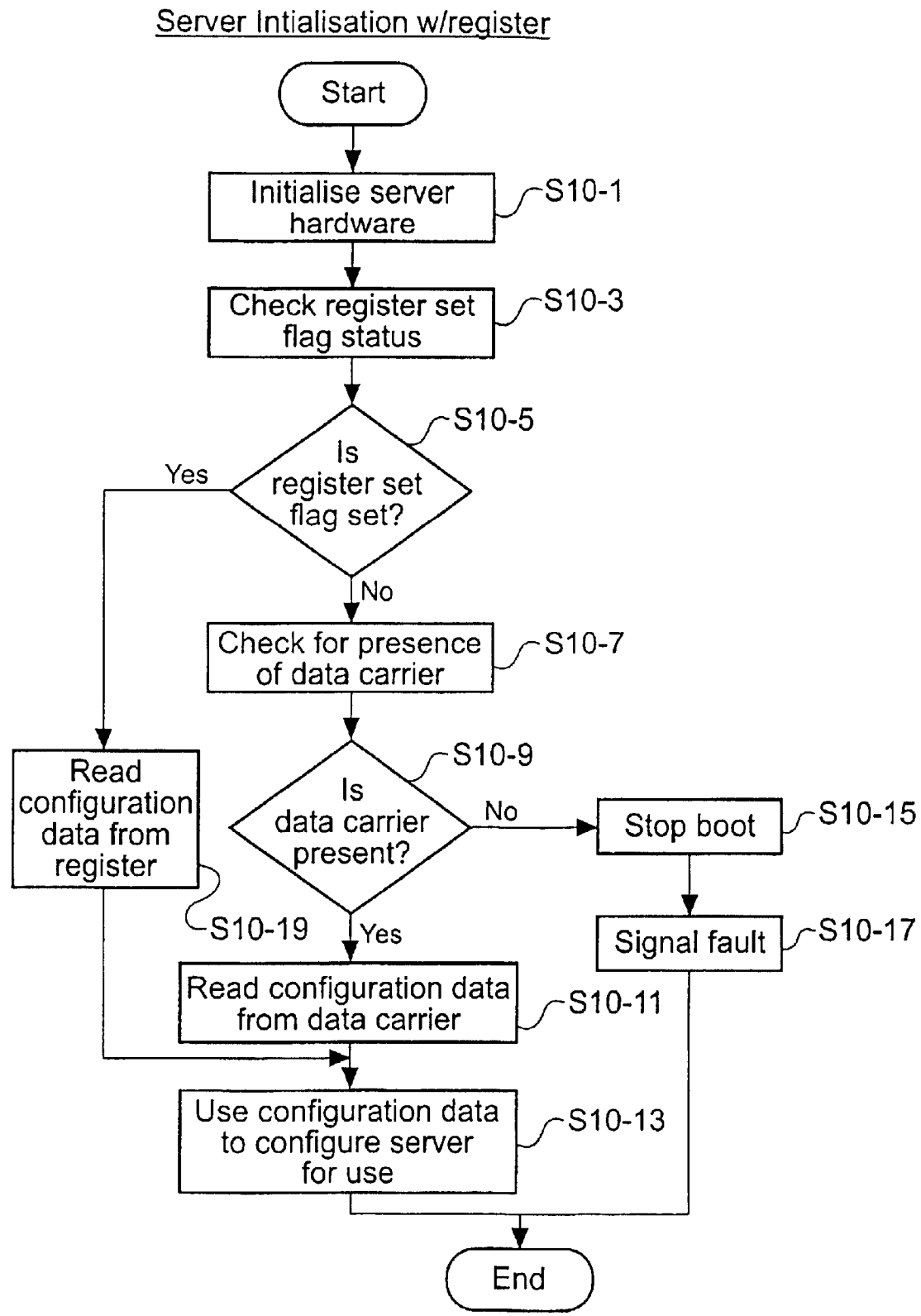
FIG. 10 is a flow chart showing the start up processes of the processor system of FIG. 9.

Referring now to FIG. 10, there is shown a flow chart of the processing steps carried out in the server processor unit 31 of the second embodiment at power-up. First, at step S10-1, the server hardware is initialised in a processing step equivalent to step S3-1 of FIG. 3. Following this, at step S10-3, a check is performed to determine the register set flag status. The result of this check is analysed at step S10-5 to determine whether the register set flag 49 is set. If the register set flag 49 is not set, indicating that there is no configuration data stored in the configuration data register 47 then processing continues at step S10-7 where a check is performed for the presence of a data carrier 15 in the card interface 41. The processing of steps S10-7 to S10-17 is identical to the processing of steps S3-3 to S3-13 of FIG. 3 and therefore will not be described again in detail here. In summary, if a data carrier 15 is present in the card interface 41 then the configuration data is read from the memory card and used to configure the server for use and if no data carrier 15 is present in the interface 41 then the boot process is stopped and a fault signalled.

On the other hand, if it is determined at step S10-5 that the register set flag 49 is set, indicating that configuration data is stored in the configuration data register 47, then processing continues at step S10-19 where the configuration data is read from the configuration data register 47. The read configuration data is then used at step S10-13 to configure the server for use. By means of the above described processing, it is therefore possible for the server processor unit 31 to be powered-up without a data carrier 15 being present in the card interface 41, provided that configuration data from a data carrier 15 has already been stored in the configuration data register 47.

Thus there has now been described an example of a networked computer system in which a portable programmable data carrier according to the second embodiment may be utilised.

Figure 11:
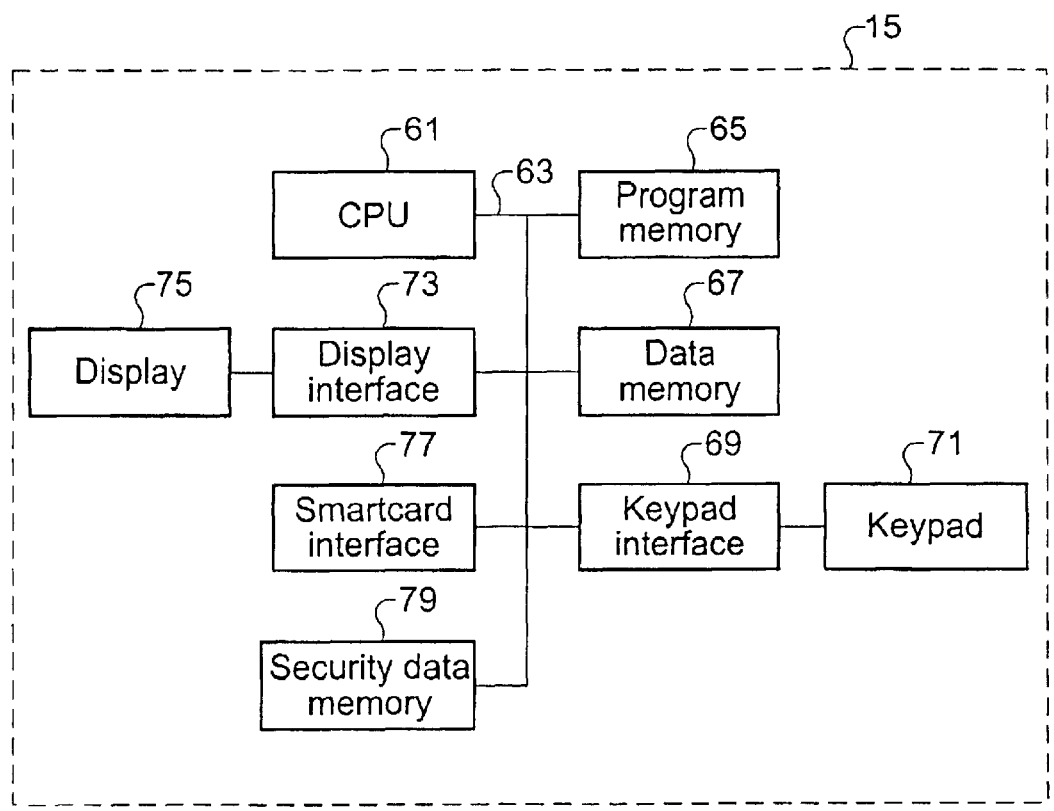
FIG. 11 is a block diagram showing a portable programmable data carrier according to the second embodiment.
Figure 12:
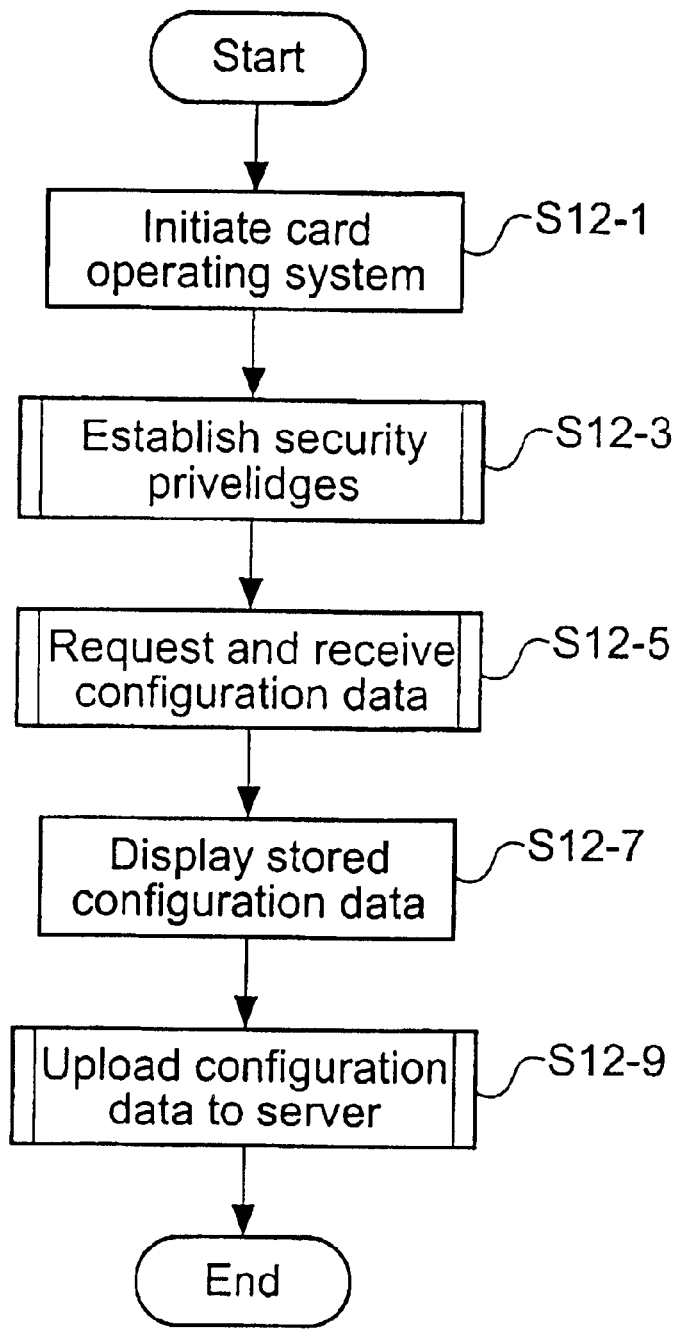
FIG. 12 is a flow chart showing the main program steps of a program carried out by the data carrier of FIG. 11.
Figure 13:
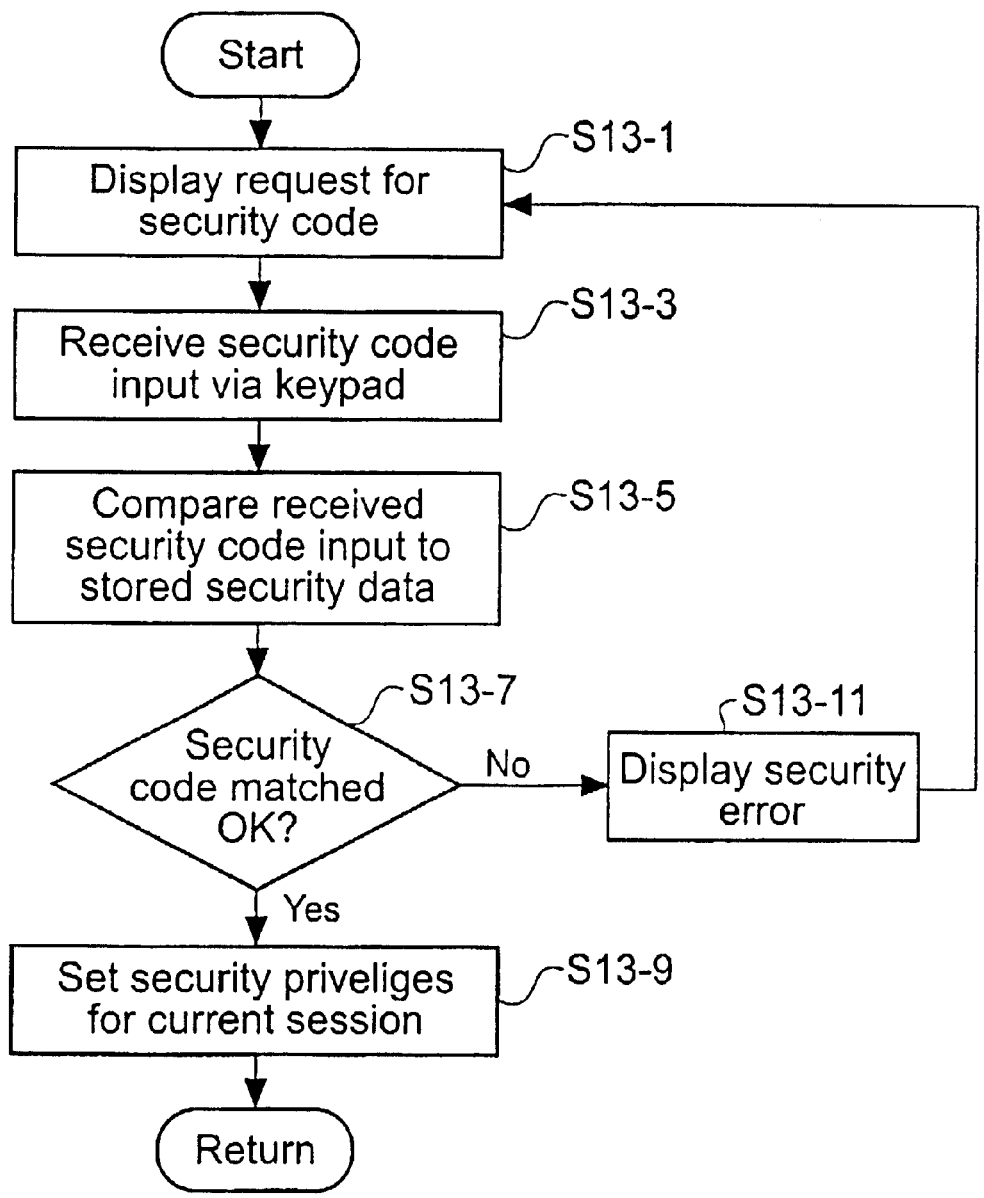
FIG. 13 is a flow chart showing the program steps involved in the program stage S12-3 of FIG. 12.

Referring now to FIGS. 11 to 13, there will now be described in detail a data carrier according to the second embodiment and the modes of operation thereof.

In FIG. 11 is shown a schematic block diagram of the functional components of the memory card 15. The CPU 61, internal bus 63, program memory 65, data memory 67, keypad interface 69, keypad 71, display interface 73, display 75 and smartcard interface 77 are arranged and operated the same as the equivalent components already described above with reference to FIG. 4. Additionally connected to the internal bus 63 is a security data memory 79. This security data memory is present to allow access to the functionality of the data carrier 15 by a user to be restricted to those users having knowledge of a predetermined security code. By providing such a security code protection, it becomes possible to ensure that persons untrained in the use of a data carrier of the present invention for programming computer servers are not able to accidentally cause configuration errors by improperly using the data carrier. In addition, it is also possible to ensure that persons intending to maliciously reprogram computer servers to cause errors are unable to do so using a data carrier of the present embodiment.

Referring now to FIG. 12, there are shown the major processing stages undertaken in the operation of the data carrier 15 of the second embodiment. First, at step S12-1, when the card is switched on by a user, the card operating system, as stored in the program memory 65, is started. Next, at step S12-3, actions are taken to ensure that the user using the data carrier 15 has knowledge of the necessary security codes to be permitted to use the data carrier 15. Following this, the processing of steps S12-5, S12-7 and S12-9 is identical to the processing of steps S6-3, S6-5 and S6-7 of FIG. 6 respectively and therefore will not be described in detail again. In summary, configuration data is requested from a user and received by the data carrier 15, the configuration data stored in the data carrier 15 is displayed to a user and then uploaded to a server for use by the server in configuration of that server.

The processing steps involved in stage S12-3 are shown in more detail in FIG. 13. The processing steps involved in stages S12-5 and S12-9 have already been described above with reference to FIGS. 7 and 8 and therefore no further description will be provided here.

Referring now to FIG. 13, the processing steps involved in determining whether the user of the data carrier 15 has knowledge of an appropriate security code is now described. First, at step S13-1, a request is displayed on display 75 for a security code to be entered. Following this, at step S13-3, a security code input is received via the keypad 71. A comparison is then performed between the received security code input and security data stored in the security data memory 79, at step S13-5. The result of this comparison is analysed at step S13-7 to determine whether the inputted security code correctly matches the stored security code, at step S13-7. If it is determined that the inputted security code does correctly match the stored security code, then processing continues at step S13-9 where a marker is set in the data memory 67 to indicate that the current user is to be allowed access to the remaining functionality of the data carrier 15. On the other hand, if it is determined at step S13-7 that the inputted security code does not match the stored security code, then processing continues at step S13-11 where an error message is displayed on the display 75 to indicate that the entered security code was incorrect and processing then returns to step S13-1 and a request for the entry of a security code is displayed on the display 75. This process will loop indefinitely until a correct security code is entered.

Thus there has now been described a system whereby unauthorised users having no knowledge of a security code are not able to access the functionality of the data carrier 15 and therefore cannot use the data carrier 15 to cause configuration errors in a server processor unit 31, whether inadvertently or deliberately.

It has been described above in the second embodiment, with particular reference to FIGS. 11 to 13 to use a security code system to prevent unauthorised use of a data carrier 15 according to the present invention. There will now be described with reference to FIG. 14 a modified security system wherein a user is again requested to enter a security code before being allowed access to the functionality of the data carrier 15, however in the present embodiment a plurality of predetermined security codes are stored in the security data memory 79, each different security code allowing access to different functionality of the data carrier 15. For example, a first security code may allow a user of the data carrier 15 to view configuration data already stored in the data carrier 15 and to upload that data to a server, but not to alter the configuration data already stored in the data carrier 15. A second security code would allow a user to change the configuration data stored in the data carrier 15 as well as to view that data and to upload that data to a server.

Figure 14:
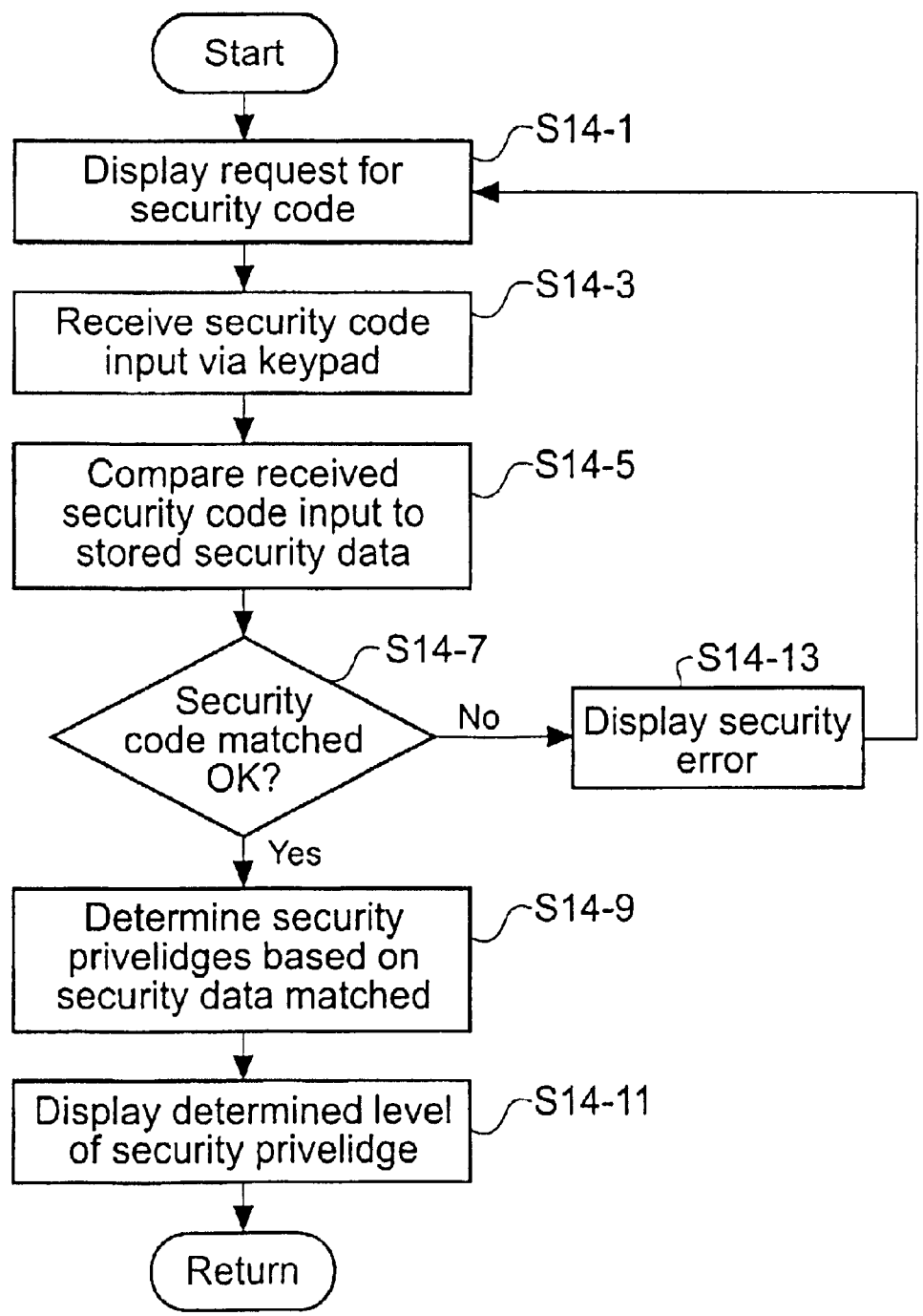
FIG. 14 is a flow chart showing the program steps involved in the processing stage S12-3 of FIG. 12 according to a third embodiment.

Referring therefore to FIG. 14, there are shown the processing steps required to implement a multi-level security code system for a data carrier 15 according to the present embodiment. First, at step S14-1 a request is displayed on the display 75 for a security code to be entered. Next, at step S14-3, a security code input is received via the keypad 71. The received security code input is then compared, at step S14-5, to the stored security codes stored in the security data memory 79. The result of this comparison is studied at step S14-7 to determine whether a valid security code has been matched by the input security code. If it is determined that the input security code matches a stored security code then processing continues at step S14-9 where the security privileges of the current user are determined based on which predetermined security code was matched by the input security code. Following this, at step S14-11, the determined level of security access is displayed on the display 75 to allow the user of the data carrier 15 to know what functionality of the data carrier 15 that user is going to be permitted to make use of. On the other hand, if it is determined at step S14-7 that the entered security code does not match a stored security code the processing continues at step S14-13 and an error is displayed. Processing then returns to step S14-1 and a new request is displayed for the entry of a security code. This loop will continue indefinitely until a valid security code is entered.

Thus there has now been described a method whereby the single level security system of the second embodiment may be modified to allow the use of multiple level security in controlling access to the functionality of the data carrier 15.

As will be appreciated by those skilled in the art, various modifications may be made to the embodiments herein before described without departing from the scope of the claimed invention. In particular, it will be understood that various features of the embodiments are interchangeable with features of other embodiments, for example it is not necessary that a data carrier making use of a security access system be used with a server processor unit having a configuration data register. The data carrier having a security access system may also be used with a server processor unit not having a configuration data register, and likewise a data carrier having no security access system may be used with a server processor unit having a configuration data register for. Examples of other possible modifications of the system of the present invention will now be described.

Although it has been described above with particular reference to FIGS. 4 and 5 that the data carrier should be a smartcard conforming to the standard ISO 7816 for integrated circuit cards with electrical contacts, the data carrier will in fact take many forms. For example, it may be a smartcard conforming to the standard ISO 10536 for contactless integrated circuit cards or it may be a so called "PC-card" conforming to the PCMCIA standards. Another possibility is to use other contactless interfaces such as IRDA or an RF based system. Alternatively, a proprietary system for a computer readable memory card could be developed for use with the system of the present invention.

Although it has been described above with particular reference to the first embodiment that if a server is unable to complete an initialisation due to a lack of presence of a data carrier to provide configuration data by lighting lamp on the server casing or by transmitting an error message to a default network address for fault reporting, this should not be interpreted as limiting as any known method of fault reporting or indication for a computer system may be used. For example, the fault could be indicated by sounding a buzzer or other audible signal either at the server or at a remote monitoring station, likewise a visible signal could be caused to be activated at a remote monitoring station as well as at the server casing.

Although it has been described above with particular reference to FIG. 5 to have a separate keypad and display, it is possible that these two elements could be combined into a single touch sensitive display, which displays are well known in the field of portable computers.

Although it has been described above with particular reference to FIG. 5 to provide the data carrier with an integral power supply, this should not be interpreted as restrictive as it is possible that a user manually inputting or reviewing configuration data would plug the data carrier into a separate power source. Such a separate power source could provide the power via the smartcard interface or via a separate power interface provided on the data carrier.

Although it has been described above with particular reference to FIG. 5 that the memory card should be powered by a solar cell, this should not be interpreted as restrictive and any power supply suitable for use on a memory card could be used. For example, a small rechargeable cell or a large value "super" capacitor could be fitted.

If the data carrier were of a sufficiently large format, an edge of the card which would normally lie outside of a card slot when the card were inserted to interface with a server could carrier LED indicators to indicate activity or progress during the configuration/boot process of that server.

Although it has been described above that a security code required for access to the functionality of the data carrier is to be entered via the keypad, other methods of entering a security clearance signal may be used. Systems such as biometric security systems could be used to control access to the functionality, for example a fingerprint scanner may be integrated into the surface of the data carrier and a successful fingerprint scan be required for security clearance.

The memory card could also carry FRUID (Field Replaceable Unit Identity) information for the system together with fault logs communicated to it by the server. These could then be downloaded by service personnel who would remove the card from the server, and insert it into a portable computer which would then extract the information.

Although it has been described above with reference to the second and third embodiments that the security data stored in the security data memory is a predetermined security data, it would be appreciated that functionality may be provided to allow this security data to be changed. Such functionality may be provided at a part of the internal program of the memory card or by a memory card programming computer into which the memory card would be inserted to have programming loaded into it. Such a programming computer could be used for example, also to make changes to the internal programming of the memory card to add or remove programming features.

Although it has been described above with particular reference to FIGS. 4 and 11 to provide the data carrier with separate program, data and security memories, such an arrangement is not restrictive, and the data carrier may be provided with a single physical memory which serves all of the above functions. Obviously other arrangements of physical memories are possible.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A portable programmable data carrier comprising:
   a processor and storage integral to the data carrier;
   a user input interface integral to the data carrier operable to receive manually input configuration data for a programmable processing apparatus including at least data describing a network identity for the programmable processing apparatus and manually inputted security criteria data;

a display integral to the data carrier operable to display configuration data; and a communications interface integral to the data carrier and operable to interface with a programmable processing apparatus to transfer system configuration data from the storage to the programmable processing apparatus;

wherein the storage is operable to store:
   operating instructions for the processor;
   system configuration data including at least one of a network address and a host ID for the programmable processing apparatus;
   data describing a plurality of different predetermined security criteria; and
   processor executable instructions to cause the processor to become configured to compare the stored predetermined security criteria with inputted security criteria data inputted via the user input interface and to allow in dependence upon the result of the comparison:
      further use of the data carrier;
      access to different configuration data stored in the storage; and
      the transfer of different configuration data stored in the storage via the communications interface.

2. The portable programmable data carrier of claim 1, wherein the portable data carrier is a PCMCIA format device and said communications interface comprises a PCMCIA interface.

3. The portable programmable data carrier of claim 1, wherein the portable data carrier is a microchip card format device and said communications interface comprises a microchip card interface.

4. The portable programmable data carrier of claim 3, wherein the portable data carrier conforms to ISO 7816.

5. The portable programmable data carrier of claim 3, wherein the portable data carrier conforms to ISO 10536.

6. The portable programmable data carrier of claim 1, further comprising a power supply integral to the data carrier operable to provide power to the data carrier.

7. The portable programmable data carrier of claim 6, wherein said power supply comprises a photocell.

8. The portable programmable data carrier of claim 6, wherein said power supply comprises a rechargeable cell.

9. The portable programmable data carrier of claim 6, wherein said power supply is arranged to provide power only when the data carrier is not connected to a programmable processing apparatus via the communications interface.

10. The portable programmable data carrier of claim 1, wherein said user input interface and said display comprise a unitary touch sensitive screen.

11. The portable programmable data carrier of claim 1, wherein said display comprises an LCD.

12. The portable programmable data carrier of claim 1, wherein the storage is operable additionally to store configuration data describing a hardware ID for a programmable processing apparatus.

13. The portable programmable data carrier of claim 1, wherein the data carrier is arranged to permit the data describing the predetermined security data to be written to the storage via the communications interface.

14. A method for providing configuration data to a programmable processing apparatus, the method comprising:
   receiving a manual inputting of security data to a portable programmable data carrier via a user input interface integral to the data carrier;

comparing the inputted security data to data stored in storage integral to the portable programmable data carrier: and determining whether to allow:
   further use of the data carrier:
   access to different system configuration data stored in the storage: and
   the outputting of the configuration data based on the result of said comparison: and if it is determined that the future use, access and outputting are allowable:
   receiving a manual inputting of configuration data which includes at least one of a network address and a host ID to the portable programmable data carrier via the user input interface;
   storing the inputted configuration data in the storage; and
   outputting the configuration data from the data memory to a programmable processing apparatus via a communications interface integral to the data carrier and a matched communications interface integral to the programmable processing apparatus.

15. A smartcard for use in configuring a programmable processing apparatus, the smartcard comprising;
   processor means:
   storage means:
   power supply means for providing power to the smartcard;
   input means for manually inputting configuration data for a programmable processing apparatus to the smartcard, wherein the configuration data includes at least data describing a network identity for the programmable processing apparatus and manually inputted security criteria data;
   display means for displaying data inputted to the smartcard;
   interface means for outputting the inputted configuration data to the programmable processing apparatus, wherein the storage means is operable to store:
   operating instructions for the processor means;
   system configuration data including at least one of a network address and a host ID for the programmable processing apparatus;
   data describing a plurality of different predetermined security criteria; and
   processor executable instructions to cause the processor means to become configured to compare the stored predetermined security criteria with inputted security criteria data inputted via the input means and to allow in dependence upon the result of the comparison:
      further use of the smartcard;
      access to different configuration data stored in the storage means; and
      the output of different configuration data stored in the storage means via the interface means.

16. A programmable memory card for storing system configuration data including at least one of a network address and a host ID for a programmable processing apparatus, the programmable memory card comprising:
   processor means:
   means for manually inputting data including configuration data and security criteria data to the card;
   means for displaying data input to the card;
   means for outputting the configuration data to a programmable processing apparatus; and means for storing:
  operating instructions for the processor means;
  system configuration data for the programmable processing apparatus;
  data describing a plurality of different predetermined security criteria; and
  processor executable instructions executable to cause the processor means to become configured to compare the stored predetermined security criteria with inputted security criteria data inputted via the means for manually inputting data and to allow in dependence upon the result of the comparison:
    further use of the programmable memory card;
    access to different configuration data stored in the means for storing: and
    the output of different configuration data stored in the means for storing via the means for outputting,
  wherein the processor means, the means for inputting, the means for displaying, the means for outputting and the means for storing are integral to the memory card.

17. A programmable processing apparatus comprising a data carrier reader, and a portable programmable data carrier comprising:
  a processor and storage integral to the data carrier;
  a user input interface integral to the data carrier operable to receive manually input configuration data for a programmable processing apparatus including at least data describing a network identity for the programmable processing apparatus and manually inputted security criteria data;
  a display integral to the data carrier operable to display configuration data; and
  a communications interface integral to the data carrier and operable to interface with a programmable processing apparatus to transfer system configuration data from the storage to the programmable processing apparatus;
  wherein the storage is operable to store:
    operating instructions for the processor;
    system configuration data including at least one of a network address and a host ID for the programmable processing apparatus;
    data describing a plurality of different predetermined security criteria: and
    processor executable instructions to cause the processor to become configured to compare the stored predetermined security criteria with inputted security criteria data inputted via the user input interface and to allow in dependence upon the result of the comparison:
      further use of the data carrier;
      access to different configuration data stored in the storage; and
      the transfer of different configuration data stored in the storage via the communications interface,
  wherein the communications interface integral to the data carrier is arranged to interface with the data carrier reader for the transfer of the system configuration data for the programmable processing apparatus from the storage to the programmable processing apparatus.

18. The apparatus of claim 17, wherein the storage is configured for storing configuration data for a further programmable processing apparatus having a data carrier reader associated therewith.

19. The apparatus of claim 18, wherein the programmable processing apparatus is configured to receive the configuration data via said user input interface and to output the configuration data to the further programmable processing apparatus via said communications interface.

* * * * *